(12) United States Patent
Klev (10) Patent No.: US 9,999,318 B2
(45) Date of Patent: Jun. 19, 2018

(54) HAND-HELD ROTISSERIE DEVICE

(71) Applicant: Kurtis L. Klev, Ogden, UT (US)

(72) Inventor: Kurtis L. Klev, Ogden, UT (US)

( * ) Notice: Subject to any disclaimer, the term of this patent is extended or adjusted under 35 U.S.C. 154(b) by 784 days.

(21) Appl. No.: 14/532,833

(22) Filed: Nov. 4, 2014

(65) Prior Publication Data

US 2015/0135970 A1     May 21, 2015

Related U.S. Application Data

(60) Provisional application No. 61/903,149, filed on Nov. 12, 2013.

(51) Int. Cl.
    *A47J 37/04*        (2006.01)

(52) U.S. Cl.
    CPC .................. *A47J 37/049* (2013.01)

(58) Field of Classification Search
    CPC ........ A47J 37/04; A47J 37/049; A47J 37/041; A47J 37/043
    USPC ....... 99/421, 419, 421 H, 421 R, 421 V, 427
    See application file for complete search history.

(56) References Cited

U.S. PATENT DOCUMENTS

| | | | | |
|---|---|---|---|---|
| 2,883,923 A | * | 4/1959 | Whitehead | A47J 37/041 126/15 R |
| 3,320,873 A | * | 5/1967 | Nissen | A47J 37/048 99/423 |
| 3,745,910 A | * | 7/1973 | Delamater | A47J 43/18 99/419 |
| 4,034,661 A | | 7/1977 | Boosalis et al. | |
| 4,508,028 A | | 4/1985 | Booker, Jr. | |
| 5,117,558 A | * | 6/1992 | Hull | A47J 43/18 30/323 |
| 5,238,445 A | * | 8/1993 | Green | A47J 37/0694 452/198 |
| 5,310,381 A | * | 5/1994 | Green | A47J 37/0694 452/198 |
| D377,888 S | * | 2/1997 | Griffin | D7/683 |
| 5,761,991 A | | 6/1998 | Kambies | |
| D395,988 S | * | 7/1998 | Badour | D7/683 |
| 6,508,167 B1 | * | 1/2003 | Lu | A47J 37/0745 99/419 |

(Continued)

FOREIGN PATENT DOCUMENTS

AU     2010203030 A1     8/2010
AU     2014100149 A4     4/2014

(Continued)

*Primary Examiner* — Dana Ross
*Assistant Examiner* — Lawrence Samuels
(74) *Attorney, Agent, or Firm* — Thorpe North & Western LLP (57) ABSTRACT

A hand held rotisserie device is disclosed having a handle with a rod extending outward from a distal end of the handle, wherein a longitudinal axis of the handle and a longitudinal axis of a proximal end of the rod are substantially parallel. A distal end of the rod has an offset member oriented substantially parallel to a proximal end of the rod and disposed laterally away from the proximal end of the rod. A rotatable assembly is disposed on a distal end of the rod, wherein the rotatable assembly is oriented to rotate in a direction substantially parallel with a longitudinal axis of the offset member. A food attachment device is coupled to the rotatable assembly and a drive mechanism is coupled to the handle and the rotatable assembly.

20 Claims, 5 Drawing Sheets

(56) References Cited

U.S. PATENT DOCUMENTS

| | | | |
|---|---|---|---|
| 6,526,877 B2 | 3/2003 | McConnell | |
| 6,539,842 B1 | 4/2003 | Chapman et al. | |
| 6,742,445 B2 | 6/2004 | Backus et al. | |
| 6,837,149 B1 | 1/2005 | Tsontakis | |
| 7,007,593 B2 | 3/2006 | Huang et al. | |
| 7,219,936 B1 * | 5/2007 | Willford | A47J 37/04 |
| | | | 294/61 |
| 7,234,392 B1 | 6/2007 | Arndt | |
| 7,735,416 B2 * | 6/2010 | Ekberg | A47J 37/0763 |
| | | | 126/30 |
| 8,087,352 B2 * | 1/2012 | Thompson | A47J 37/041 |
| | | | 99/419 |
| 8,776,675 B1 | 7/2014 | Meris et al. | |
| D713,695 S * | 9/2014 | Hurt | D7/683 |
| 2006/0076789 A1 * | 4/2006 | Hebert | A47J 37/0786 |
| | | | 294/61 |
| 2007/0006869 A1 | 1/2007 | Spangrud | |
| 2008/0216809 A1 * | 9/2008 | Begotka | F24C 1/16 |
| | | | 126/30 |
| 2009/0025573 A1 * | 1/2009 | Thompson | A47J 37/041 |
| | | | 99/421 H |
| 2009/0071348 A1 * | 3/2009 | Burns | A47J 37/049 |
| | | | 99/421 R |
| 2012/0285338 A1 | 11/2012 | Anderson, Sr. | |
| 2013/0052322 A1 * | 2/2013 | Hurt | A23L 5/10 |
| | | | 426/523 |

FOREIGN PATENT DOCUMENTS

| | | |
|---|---|---|
| CA | 2448473 C | 5/2005 |
| CN | 1703159 B | 9/2010 |
| CN | 102462388 A | 5/2012 |
| DE | 20022376 U1 | 7/2001 |
| FR | 2718337 A1 | 10/1995 |
| FR | 2880786 A1 | 7/2006 |

* cited by examiner

HAND-HELD ROTISSERIE DEVICE

PRIORITY CLAIM

This application claims priority to U.S. Provisional Application No. 61/903,149 filed on Nov. 12, 2013 and titled "An Improved Hand-Held Rotisserie Device" which is incorporated herein by reference in its entirety.

FIELD OF THE INVENTION

The present invention relates to cooking devices and more particularly to an improved hand-held rotisserie device. More particularly, the present invention relates to a hand-held rotisserie device that positions food at a ninety degree angle relative the user and the heat source.

BACKGROUND OF THE INVENTION AND RELATED ART

Cooking food over an open heat source, such as a fire, is a common recreational activity for many people. In particular, cooking hot dogs or marshmallows over an open fire is frequently practiced while camping or even in an individual's backyard, on a patio, or otherwise to cook one's food. A common tool used to cook food (such as hot dogs) over an open flame is frequently referred to as a "hot dog stick" or "hot dog roaster." In its simplest form, a hot dog stick is simply that, a stick that is long enough for the individual to hold the hot dog over an open flame and cook the hot dog without being burned by the flame itself. In many instances, the fire is hotter the closer one gets to the center of the fire. As such, placing the hot dog on the end of the stick along a longitudinal axis of the hot dog results in uneven cooking of the meat where the distal end of the dog is cooked more quickly than the proximal end of the hot dog. If the hot dog is placed on the end of the stick through its center about the short axis of the hot dog (i.e., with the hot dog substantially perpendicular to the hot dog stick), it is difficult to rotate the hot dog from top to bottom for even cooking. Specifically, as the hot dog cooks, the area around the hot dog stick begins to rotate within the hot dog rather than rotating the dog itself. Similar problems are encountered when trying to cook other foods using a hot dog stick, such as marshmallows.

Many other devices have been employed in an effort to improve the hot dog cooking experience. However, all suffer from the lack of the ability to easily rotate the hot dog (or other food item, e.g., marshmallow), with the food oriented with respect to the fire in a manner that promotes even cooking of the food. A need exists, therefore, for improved systems and methods for cooking food over an open heat source such as a fire.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes an improved hand-held rotisserie device designed to improve the ease and consistency of cooking food over an open heat source. It is intended that the rotisserie device of the present invention be operable with different types of handles and rotational driving devices so long as the end result of a rotating quantity of food disposed at an angle that is substantially perpendicular to the rod and handle assembly is achieved. Bearing that in mind, the rotisserie device of the present invention, in accordance with one aspect of the invention, may be broadly described as a handle having a rod extending outwardly away from the handle, wherein a distal end of the rod comprises a ninety degree bend. The rotisserie further comprises a rotatable assembly disposed on the distal end of the rod oriented substantially non-parallel (or at an incline) to the rod. It also comprises a rotatable drive attached to the handle and operatively coupled to the rotatable assembly configured to turn the rotatable assembly as the rotatable drive is turned.

Referring now generally to the figures, in FIGS. 1-6, a hand-held rotisserie device is disclosed. The device 10 comprises a handle 15 that is approximately one foot in length. In one aspect of the invention, the handle 15 is wood. The handle 15, however, may also be constructed of a polymeric or other composite material as is known in the art. Moreover, the handle 15 may be greater than or less than one foot in length on long as it facilitates placement of a rod 20, a driving means, and provides a location for the user to grasp the handle 15. A rod 20 extends outward away from the distal end 16 of the handle 15 for a distance of approximately three feet. In one aspect of the invention, the rod 20 may comprise chrome-plated steel, stainless steel, or a heat-resistant material as is known in the art. Additionally, the rod 20 may be greater than or less than three feet as suits a particular purpose.

Figure 1:
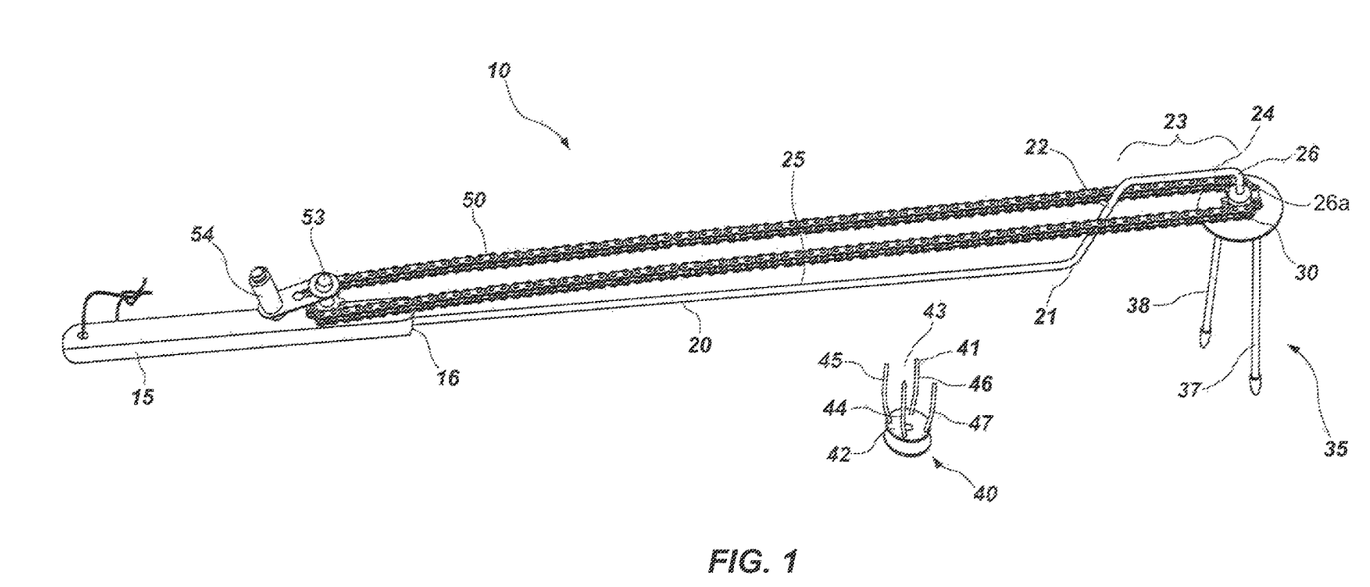
FIG. 1 is a perspective view of a rotisserie device and food attachment member in accordance with one embodiment of the invention.
Figure 2:
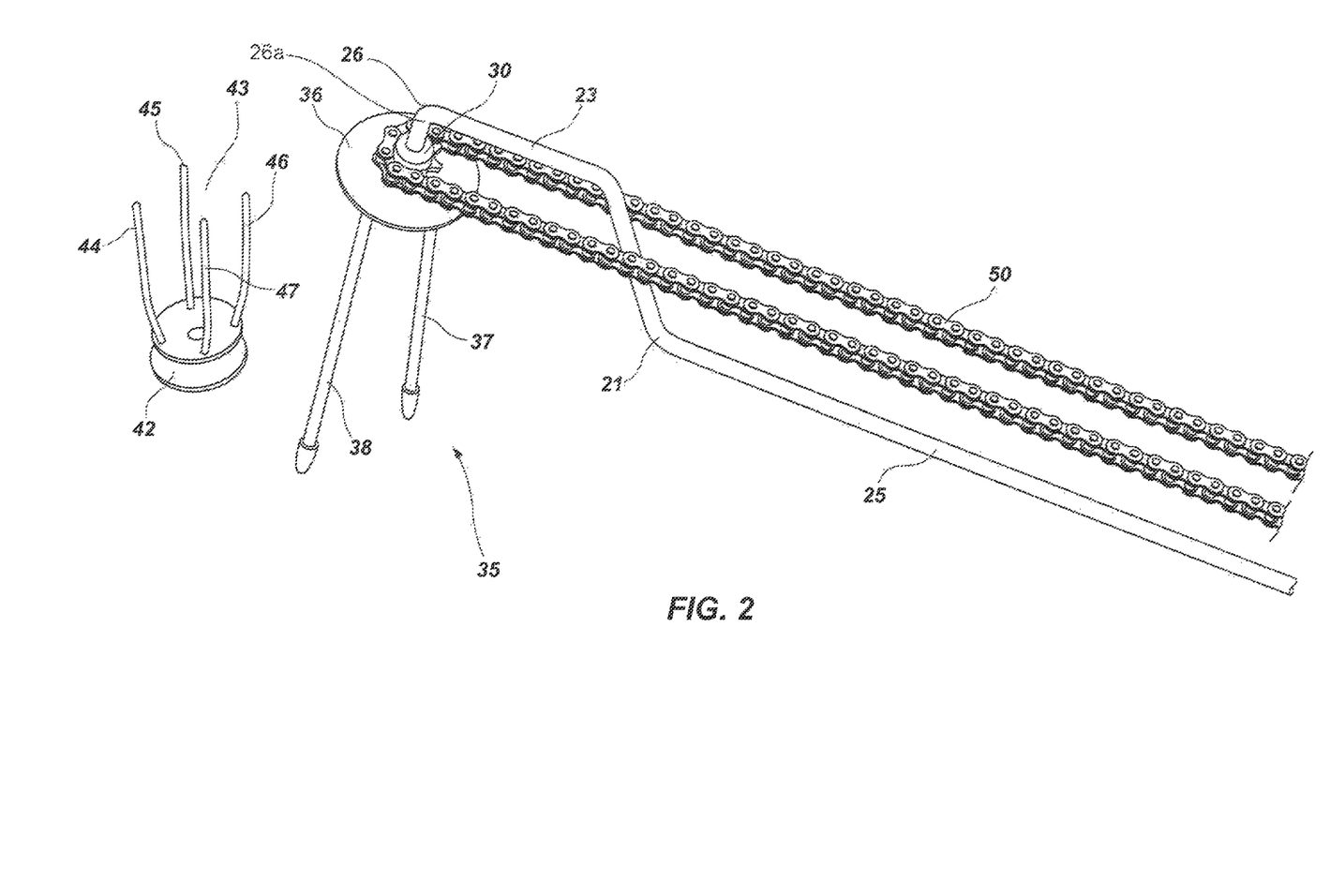
FIG. 2 is a perspective view of a distal end of the rotisserie device and food attachment member of FIG. 1 with a separate food attachment member.
Figure 3:
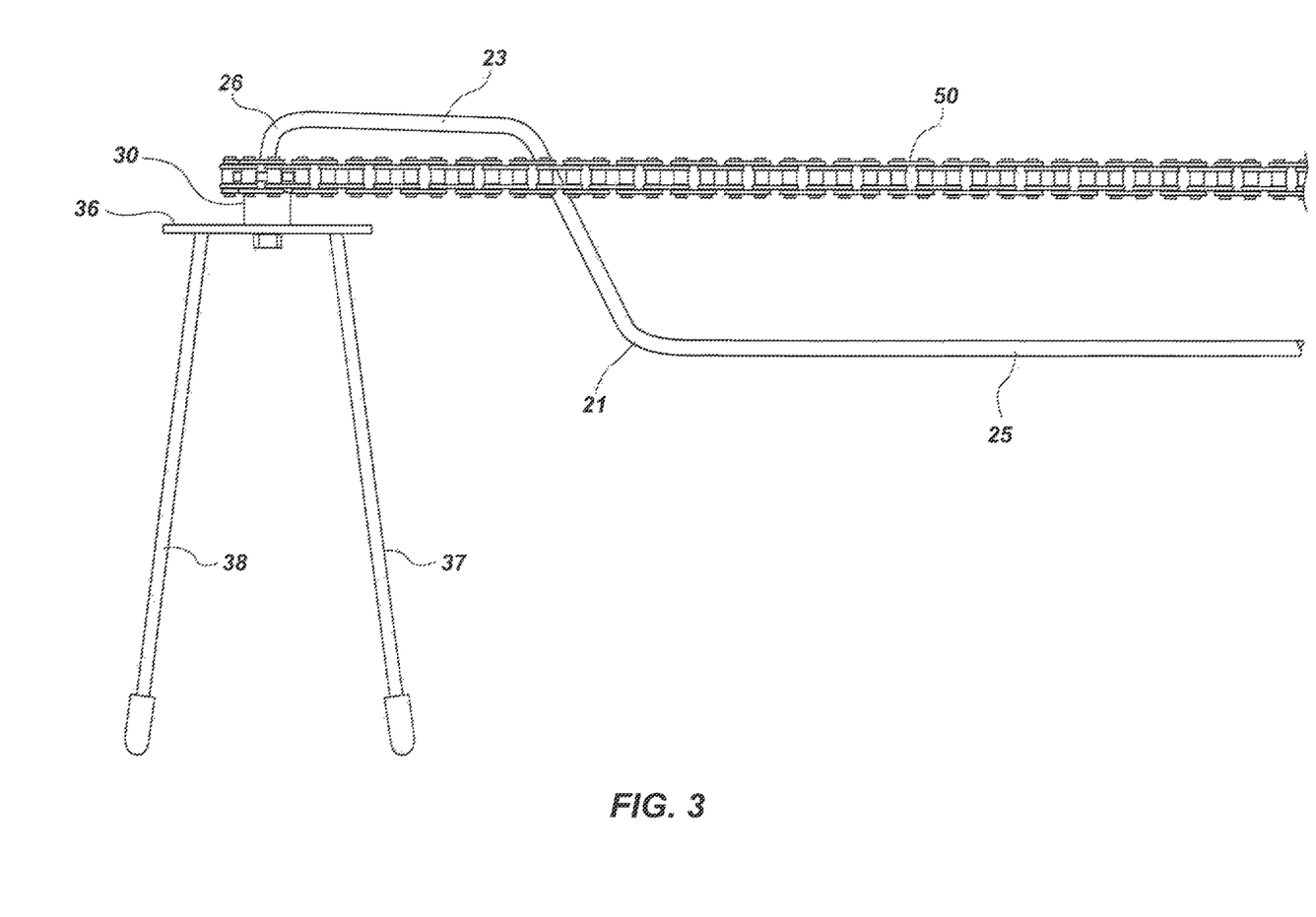
FIG. 3 is a side view of a distal end of the rotisserie device of FIG. 1.
Figure 4:
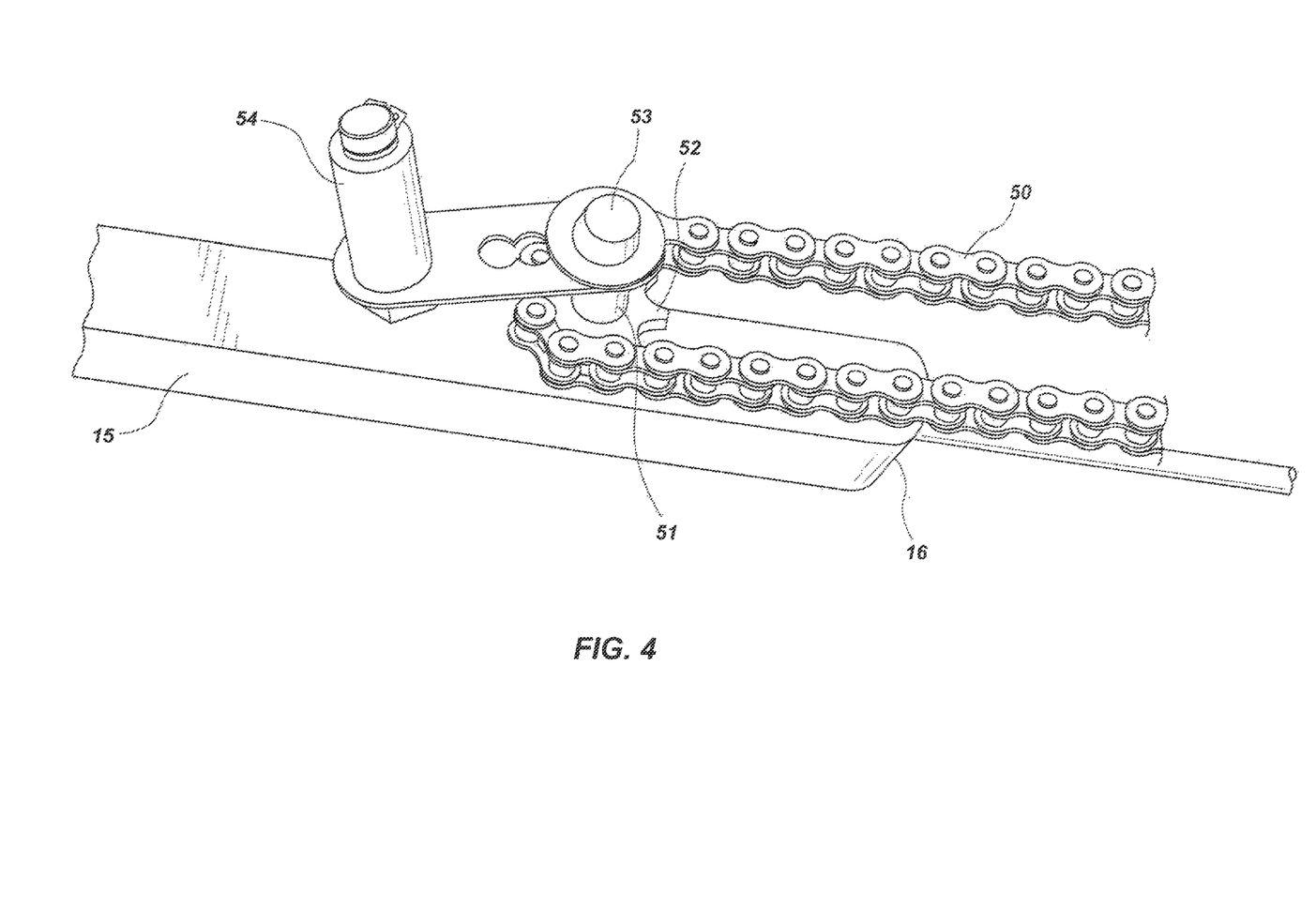
FIG. 4 is a close up perspective view of a portion of the handle of the rotisserie device of FIG. 1.

The rod 20 is oriented at an angle 21 for a small, predetermined distance (e.g., 2 inches) and then oriented back to its original direction in order create a complete distal end 23 that is offset from the remainder of the rod 20. In other words, the offset creates a distal end 23 of the rod 20 that is parallel with the proximal end 25, but not collinear with the proximal end 25 of the rod 20. As is shown in FIG. 1, distal end 23 is parallel with proximal end 25, but the two components of a single rod 20 are not collinear. The offset advantageously provides a means to couple the distal end 23 of the rod 20 to a driving means that originates from the handle 15 of the device 10. Put another way, the rod 20 comprises a transitional member 22 and end member 23 followed by a 90 degree bend 26. The 90 degree bend 26 permits coupling of an attachment member 35 to the rod assembly.

The offset angle 21 may be approximately 30 degrees as shown in the attached figures in accordance with one embodiment of the invention. However, in another aspect of the invention, the offset angle 21 may be ninety degrees or another angle as suits a particular design function. In other words, the offset angle may range from 185 degrees to approximately five degrees with respect to the rod 20 so long as an appropriate offset is achieved to facilitate connection of a rotating bearing 30 to a means for turning the bearing 30. The offset also advantageously permits the user to balance the weight of the food nearer the longitudinal axis of the rod 20 which facilitates balancing of the food product while cooking. In other words, the more the food product is extended laterally to the side of the rotisserie device, the greater force the user must exert to resist the rotational force the weight of the food induces on the rod 20 and handle 15 increasing user fatigue and lessening the user's outdoor experience.

In one aspect of the invention, the extreme distal end 26a of the rod 20 is oriented at a ninety degree angle 26 with respect to the distal end of rod 20. A bearing 30 is disposed on the extreme distal end 26a of the rod 20 with a removable food attachment device 35 coupled thereto. Advantageously, the ninety degree angle 26 on the extreme distal end 26a of the rod 20 permits food to be placed over the open heat source in such a way that a distal portion of the food is not exposed to higher heat than a proximal portion of the food. In other words, the food is not placed with the front end in a hotter location than the back end of the food. By orienting the extreme distal end 26a of the rod 20 at a ninety degree angle 26, the food is placed in a more consistent heating zone. The rotating bearing 30 allows for constant or periodic, as suits a particular purpose, rotation of the food to optimize even cooking of the food from top to bottom. While in one embodiment, the extreme distal end 26a is oriented at a ninety degree angle 26, it is understood that the extreme distal end 26a may be oriented at any angle that is inclined with respect to the longitudinal axis of the rod 20. However, in the preferred embodiment, the end 26a is oriented at a ninety degree angle 26 to optimize cooking of the food within a consistent heat zone. In one aspect of invention, the rod 20 simply comprises a 90 degree bend 26 at the distal end 26a of the rod 20. A bearing 30 and sprocket 31 are disposed about the rod 20 after the ninety degree bend and are coupled to a corresponding bearing 51 and sprocket 52 about handle 15.

In one embodiment of the invention, the removable food attachment member 35 comprises a circular plate 36 with two diametrically opposing prongs 37, 38 disposed on the plate 36. In this embodiment, the prongs 37, 38 are intended to allow for the placement of two hot dogs (one on each prong) or another type of food to be rotated at a 90 degree angle with respect to the proximal end 25 of the rod 20 and the handle 15. While a food attachment member 35 with two prongs is shown, it is contemplated herein that any number of food attachment devices may be incorporated into different embodiments of the invention. Additionally, the prongs 37, 38 may be oriented at a ninety degree angle with respect to the plate member 36 or, in another embodiment, the prongs 37, 38 may be oriented at an incline with respect to the plate 36.

The food attachment member 35 may be removable from the extreme distal end 26a of the rod 20 or it may be permanently attached. That is, when permanently attached, the food attachment member 35 may be integrally formed with the extreme distal end 26a of the rod 20, welded, or otherwise mounted to the extreme distal end 26a of the rod 20 in such a way that it cannot be removed without breaking the rod 20. When the food attachment member 35 is not permanently attached, a mechanism such as a quick-connect as is known in the art, threaded couplings, or other means can be used.

In one aspect of the invention, a four-prong food attachment device 40 may be used. The four-prong device 40 can have arcuate prongs 41 that forma claw-shaped system for enclosing a food item (e.g., a marshmallow) within the claw. The four-pronged device 40 has a closed end 42 and an open end 43 with the prongs 44, 45, 46, and 47 defining an enclosure 48. In this manner, the user need not pierce a food item with the prongs. Rather, s/he may place the food item within the four-pronged device 40 and cook the food item. Once cooking is complete, the user simply turns the device 40 on its side so the open end 43 of the claw is facing downward and the cooked food item is emptied from the claw. In other aspects of the invention, other food attachment devices may be used. For example, a single prong device may be used. The prong may be placed in the center of the plate 36 or it may be placed towards an outer perimeter of the plate 36. In another aspect of the invention, the plate 36 comprises apertures in order to assist in cooking of the portion of the food product that is placed near the plate 36.

Other food attachment members are contemplated for use herein. For example, in another embodiment of the invention, a clam-shell device configured to enclose a cake mix or a cheese sandwich may be utilized. In another aspect of the invention, a basket device may be used configured to enclose apiece of bread or other food item to be toasted over the fire. Additional rotisserie accessories may be used as are known in the art.

The rotatable bearing 30 is attached to a means for rotating the bearing 30. In one aspect of the invention, the means is a chain 50 that is coupled to a turnable sprocket 51 mounted to the handle 15 of the rotisserie device 10. The sprocket 51 is mounted to the handle 15 in such a way that the teeth 52 of the sprocket 51 are pointing in the direction of the bearing 30. The sprocket 51 is mounted to the handle 15 by way of a center pin 53. The center pin 53 is disposed within a bearing that is placed inside a side portion of the handle 15 of the rotisserie device 10. A small secondary handle 54 is mounted on a distal end of the center pin 53 to enable the user to turn the sprocket 51. The chain 50 is operatively coupled to a second sprocket 31 disposed about the rotatable bearing 30 on the extreme distal end 26a of the rod 20.

While a chain and sprocket drive system is described herein, it is understood that other embodiments of the invention can incorporate other drive systems that suit a particular design purpose so long as the user of the hot dog stick can induce rotation of the food attachment member 35. For example, belt drives, bead-type chains, heat-resistant cords or other heat-resistant materials are contemplated for use herein. In another aspect of the invention the bearing 30 disposed on the extreme distal end 26a of the rod 20 may be rotated by a gear driven assembly. In this aspect of the invention, the sprocket 51 mounted on the handle 15 of the rotisserie device 10 is operatively coupled to second sprocket disposed at a right angle with respect to the first sprocket. A drive rod is disposed within the center of the second sprocket and terminates near the bearing on the distal end of the rod of the rotisserie device. An additional pairing of sprockets is disposed on the distal end of the drive rod and operatively coupled to the bearing.

In one embodiment of the invention, a guard is disposed about the driving means to minimize contact with the driving means. In other aspects of the invention, other means for driving the rotating bearing 30 include a battery-operated drive disposed on the distal end of the rotisserie device 10. The battery-operated drive comprises an RF signal receiver. An RF signal generator is placed within the handle 15 of the device 10 and sends a signal to the RF signal receiver upon activation by the user. Once the signal is received by the RF signal receiver, the battery-operated drive rotates the food attachment member 35 until the signal is terminated. Other passive means of rotating the food attachment member 35 are contemplated for use herein in accordance with additional aspects of the invention. In one aspect of the invention, a thermal conversion unit is disposed about the distal end of rod 20 that is configured to convert thermal energy to electrical energy and can be used to power means for rotating the food attachment device 35.

Figure 5:
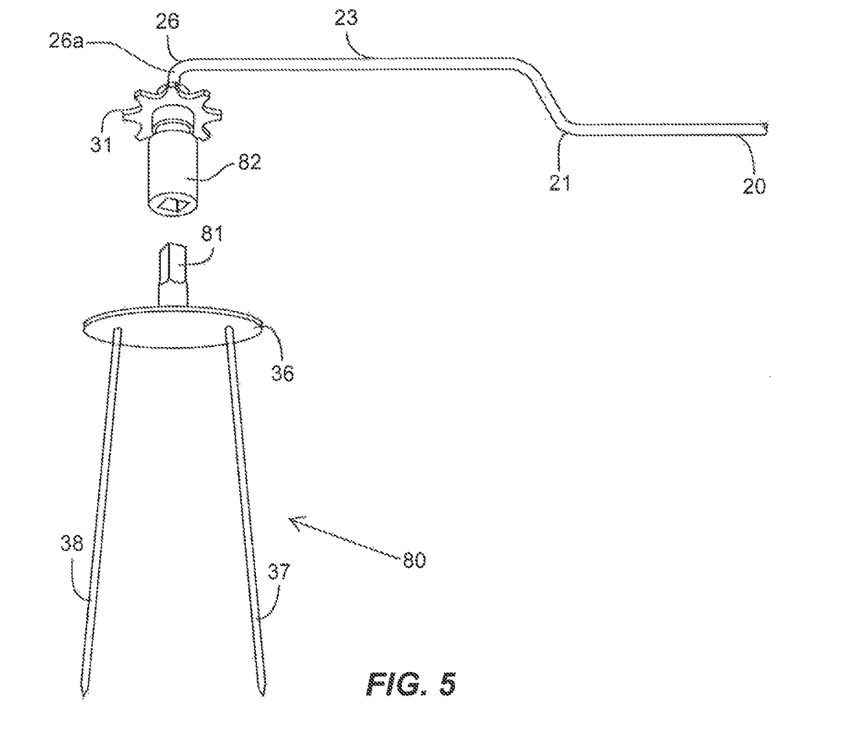
FIG. 5 is a side view of the rotisserie device of FIG. 2 with a detachable food attachment member in accordance with one embodiment of the invention.
Figure 6:
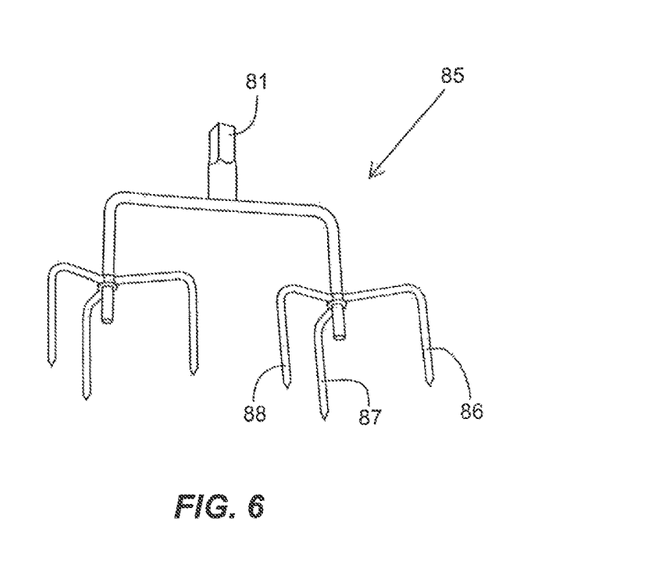
FIG. 6 is a perspective view of a food attachment member in accordance with one embodiment of the invention.

In one aspect of the invention, the food attachment device is removable from the rotisserie assembly 10. With reference to FIG. 5, the food attachment member 80 has a male distal end 81 that is configured to mate with a female receptacle 82 positioned on the rotatable bearing 30. Likewise, a detachable food attachment member 85 as shown in FIG. 6 has a male distal end 81 configured to mate with the female receptacle 82. In the aspect shown in FIG. 6, the food attachment member 85 has two claws configured to receive a food item therein or to be pierced by the respective prongs 86, 87, 88.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A hand-held rotisserie device for cooking products over an open fire comprising:
   a handle with a rod extending outwardly away from a distal end of the handle, wherein a distal end of the rod comprises a first end member that is disposed parallel to, but not collinear with the rod and a second end member located distally of the first end member disposed at an angle that is not parallel to the rod;
   a rotatable assembly disposed on the distal end of the rod oriented substantially non-parallel to the rod; and
   a rotatable drive attached to the handle and disposed externally of the handle at the proximal end of the rod, the rotatable drive operatively coupled to the rotatable assembly and configured to turn the rotatable assembly as the rotatable drive is turned at the handle.

2. The rotisserie device of claim 1, wherein a distal end of the rod is oriented at a first angle with respect to a longitudinal axis of the rod for a first predetermined distance and then oriented at a second angle.

3. The rotisserie device of claim 2, wherein the first angle and the second angle are substantially equal and wherein after the second angle, the rod extends for a second predetermined distance, the second predetermined distance comprising the end member disposed parallel to but not collinear with the rod.

4. The rotisserie device of claim 3, wherein the second predetermined distance of the rod is laterally offset from other portions of the rod.

5. The rotisserie device of claim 3, wherein the rod further comprises a ninety degree bend after the second predetermined distance.

6. The rotisserie device of claim 5, wherein the rotatable assembly is coupled to the rod near the ninety degree bend after the second predetermined distance.

7. The rotisserie device of claim 6, further comprising a food attachment device coupled to the rod after the rotatable assembly.

8. A hand held rotisserie device for cooking products over an open fire comprising:

a handle and a rod extending from a distal end of the handle, wherein the rod and the handle are substantially collinear and wherein a distal end of the rod comprises a ninety degree bend;

a rotatable assembly disposed on the distal end of the rod at the ninety degree bend, wherein the rotatable assembly rotates in a direction parallel to a longitudinal axis of a proximal end of the rod and extends externally of the rod from the ninety degree bend to the handle; and a rotatable drive attached to the handle and the distal end of the rod after the ninety degree bend, wherein the rotatable drive is operatively coupled to the rotatable assembly and configured to turn the rotatable assembly as the rotatable drive is turned at the handle on the proximal end of the rod.

9. The hand held rotisserie device of claim 8, wherein the rotatable drive comprises a first sprocket attached to the handle.

10. The hand held rotisserie device of claim 9, wherein the rotatable drive further comprises a second sprocket coupled to the rotatable assembly, wherein the first sprocket and second sprocket are coupled by a chain.

11. The hand held rotisserie device of claim 9, further comprising a detachable food attachment device coupled to the rotatable assembly.

12. The hand held rotisserie device of claim 11, wherein the detachable food device comprises a plurality of four prongs extending outwardly from a base.

13. The hand held rotisserie device of claim 12, wherein the prongs are disposed about a perimeter of the base.

14. The hand held rotisserie device of claim 11, wherein the detachable food device comprises a plurality of two prongs extending outward from a plate.

15. The hand held rotisserie device of claim 14, wherein the prongs are oriented non-parallel to one another.

16. A hand held rotisserie device, comprising:

a handle having a rod extending outward from a distal end of the handle, wherein a longitudinal axis of the handle and a longitudinal axis of a proximal end of the rod are substantially parallel;

wherein a distal end of the rod comprises an offset member oriented substantially parallel to a proximal end of the rod and disposed laterally away from the proximal end of the rod, the offset member providing an offset attachment point for coupling to an external drive mechanism;

a rotatable assembly disposed on a distal end of the rod and the offset member, wherein the rotatable assembly is oriented to rotate in a direction substantially parallel to a longitudinal axis of the offset member;

a food attachment device coupled to the rotatable assembly; and the external drive mechanism being disposed about an exterior of the handle at the proximal end of the rod and coupled to the handle and the rotatable assembly, the external drive mechanism comprising a first sprocket disposed about the handle, a second sprocket disposed about the offset attachment point of the offset member of the distal end of the rod, and a chain coupled to the first and second sprockets.

17. The rotisserie device of claim 16, wherein the food attachment device is configured to rotate in a direction substantially parallel to a longitudinal axis of the proximal end of the rod.

18. The rotisserie device of claim 16, wherein the food attachment device comprises a plurality of two claws, each claw comprising a plurality of prongs.

19. The rotisserie device of claim 16, wherein the drive mechanism comprises a device for manually turning the drive mechanism.

20. The rotisserie device of claim 16, wherein the drive mechanism comprises a device for automatically turning the drive mechanism.

* * * * *